United States Patent
Gierling et al.

(10) Patent No.: US 6,632,157 B1
(45) Date of Patent: Oct. 14, 2003

(54) METHOD FOR REDUCING THE THERMAL LOAD ON AN AUTOMATIC TRANSMISSION FOR A MOTOR VEHICLE IN EMERGENCY OPERATING MODE

(75) Inventors: Armin Gierling, Langenargen (DE); Hans-Dieter Hengstler, Ravensburg (DE); Helmut Hofstätter, Meckenbeuren (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/787,561
(22) PCT Filed: Sep. 23, 1999
(86) PCT No.: PCT/EP99/07072
§ 371 (c)(1), (2), (4) Date: Mar. 19, 2001
(87) PCT Pub. No.: WO00/19130
PCT Pub. Date: Apr. 6, 2000

(30) Foreign Application Priority Data

Sep. 29, 1998 (DE) .......................... 198 44 618

(51) Int. Cl.$^7$ ............................................. F16H 59/64
(52) U.S. Cl. ...................................................... 477/98
(58) Field of Search .......................... 477/98, 107, 111

(56) References Cited

U.S. PATENT DOCUMENTS

| | | | |
|---|---|---|---|
| 4,779,577 A | 10/1988 | Ritter et al. | 123/41.05 |
| 4,807,495 A | 2/1989 | Wallace | 74/844 |
| 4,962,680 A | 10/1990 | Kirstein | 74/866 |
| 5,029,492 A | * 7/1991 | Kiuchi | 477/101 |
| 5,103,692 A | 4/1992 | Shimanaka et al. | 74/857 |
| 5,445,128 A | 8/1995 | Letang et al. | 123/436 |
| 5,460,581 A | 10/1995 | Ueda | 477/126 |
| 5,961,408 A | * 10/1999 | Konig et al. | 474/18 |
| 6,088,631 A | * 7/2000 | Kuehn et al. | 477/76 |
| 6,146,309 A | * 11/2000 | Nishino et al. | 477/168 |
| 6,203,468 B1 | * 3/2001 | Nitta et al. | 477/107 |

FOREIGN PATENT DOCUMENTS

| | | | |
|---|---|---|---|
| DE | 14 55 474 | | 1/1969 |
| DE | 33 03 565 C2 | | 10/1991 |
| DE | 40 37 092 A1 | | 5/1992 |
| DE | 44 36 506 A1 | | 4/1996 |
| DE | 197 55 128 A1 | | 6/1998 |
| GB | 2320339 B | * 3/1999 | F02D/29/02 |

OTHER PUBLICATIONS

Japanese Abstract, vol. 1998, No. 10 dated Aug. 31, 1998 & JP 10 122005 A to Unisia Jecs Corp., dated May 12, 1989.

* cited by examiner

Primary Examiner—Douglas C. Butler
Assistant Examiner—Robert A. Siconolfi
(74) Attorney, Agent, or Firm—Davis & Bujold, P.L.L.C.

(57) ABSTRACT

In an automatic transmission for a motor vehicle which is controlled by an electronic transmission control device which continuously exchanges signals with a digital engine electronic system of an internal combustion engine, to reduce the thermal load on the automatic transmission in emergency operating mode, a transmission-independent program module (M1) of the digital engine electronics system presets an admissible maximum engine torque for the emergency operating mode (M_mot_max_not).

18 Claims, 2 Drawing Sheets

Figure 1:
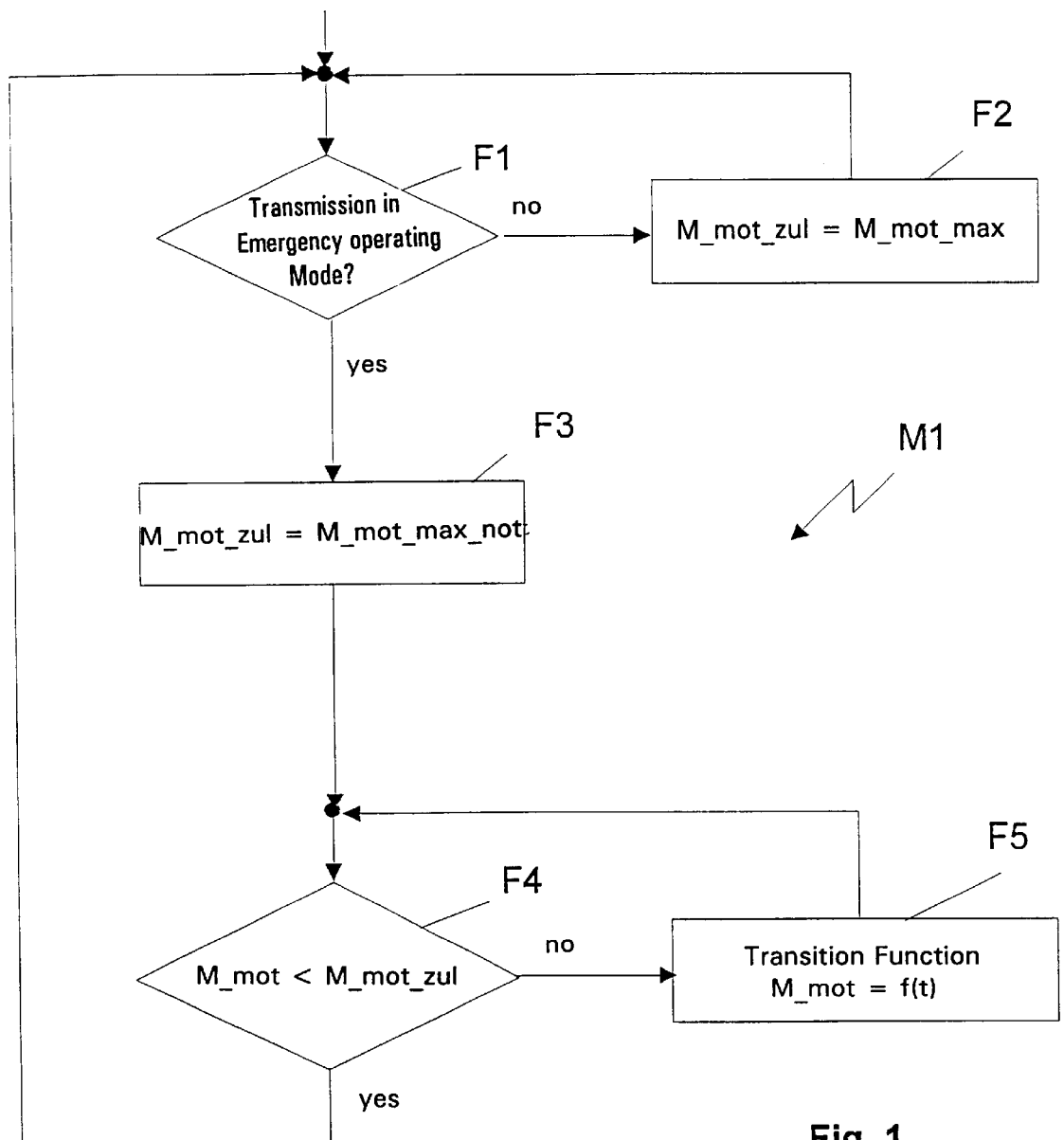

METHOD FOR REDUCING THE THERMAL LOAD ON AN AUTOMATIC TRANSMISSION FOR A MOTOR VEHICLE IN EMERGENCY OPERATING MODE

FIELD OF THE INVENTION

The invention relates to a method for reducing the thermal load of an automatic transmission for a motor vehicle in an emergency operating mode.

BACKGROUND OF THE INVENTION

The utilization of the intelligence in electronics finds its expression in motor vehicles having modern automatic transmissions in the use of an electronic transmission control (EGS) in which, to a great extent, the criteria known to be relevant are met for the customers such as driving comfort and driveability and also relevant to security. For the selection of a gear, according to situation, the electronic transmission control steadily communicates with other control units and computers of different aggregates via a CAN (Controller Area Network) data bus.

For the case of a defect in the electronic transmission control, emergency operating programs have often been provided which are designed so that in an emergency operating mode a vehicle can be operated in the widest possible driving range. But depending on the emergency running, the cooling of the transmission is problematic in such an emergency operating mode, since the heat accumulation in the emergency operating mode of the transmission must be eliminated, via the cooling system of the vehicle and, in case of complete failure of the electronic transmission control, the transmission has no possibilities of its own to positively act upon the thermal economy.

This particularly occurs in CVT (Continuously Variable Transmission) automatic transmissions which have a variator for continuous adjustment of a reduction ratio between a shortest possible ratio (LOW) and a longest possible ratio (overdrive, OD).

Such a CVT transmission with a first cone pulley pair upon an input shaft as a primary pulley set and with a secondary cone pulley pair upon an output shaft as a secondary pulley set has been described in "ATZ Automobiltechnische Zeitschrift" 96 (1994). Each cone pulley pair consists of a first pulley axially stationary and a second pulley movable in axial direction which are designated as a primary pulley and a secondary pulley according to which of the primary or secondary pulley sets they belong. A torque-transmitting element which constitutes, e.g. a linked band, is wound around the cone pulley pairs. To adjust the primary pulley or the secondary pulley, they are loaded with a pressure medium from a pressure source, the pressure acting, respectively, on adjusting chambers of a primary pulley and a secondary pulley controlled with the aid of an electronic transmission control and an electrohydraulic pressure-supply device.

DE 44 36 506 has disclosed a device for control of a CVT transmission in which an electronic control unit determines, via electromagnetic actuators and hydraulic valves, the pressure level of the adjusting chambers of a primary pulley and a secondary pulley which are not dynamically balanced.

For a failure of the electronic control unit, an emergency operating device is provided which has two pressure-regulating valves, two pressure-reducing valves and at least one emergency valve, wherein a primary valve and a secondary valve adjust a constant static pressure ratio or power ratio between primary pulley and secondary pulley in constant static secondary pressure level.

The magnitude of the ratio change of the CVT transmission from a normal operation to the emergency operating mode can be established, via the amount of the static power ratio and the dynamic forces on the pulleys not dynamically pressure balanced. At the same time, the emergency operating mode is described as a state of the CVT transmission in which a rotational speed regulation and a contact regulation of the secondary pulley is interrupted.

In this known device, the ratio of the CVT transmission varies according to the generated torque of an internal combustion engine provided as input unit wherein the variable ratio change in the emergency operating mode makes a reliable start on the hill possible and an improved driveability at high top speed.

As input signals are supplied to an electronic control unit, for example the signal of a load position of the input unit like the throttle valve position in case of an internal combustion engine, the rotational speed of the transmission input shaft, the rotational speed of the output shaft, or the temperature of the pressure medium. From the input signal, an operating point is determined and the appertaining rotational speed of the transmission input shaft or the ratio of the CVT transmission adjusted. When an error occurs, the CVT transmission changes over to the emergency operating mode in which no rotational speed regulation and no contact pressure regulation of the secondary pulley no longer takes place.

Even through this known solution offers the widest possible adjustment range of the variator, it is problematic that the contact pressure for the corresponding pulleys must be designed according to extreme angular points of the driveability range. One of the angular points is the guaranty of the maximum starting power in the lowest gear, i.e. in or near the LOW ratio. For the variator capacity of transmission, a higher contact pressure on the secondary pulley is required at high ratio and high input torque. As result of the constant static pressure ratio between primary pulley and secondary pulley, the static force adjusted on the secondary pulley, whose magnitude depends on the maximum input torque to be transmitted, is constant in the whole torque range.

However, the consequence of this in wide driving ranges is an undesired overpressure, which disadvantageously leads to a high operating temperature in the variator with increased loss of effectiveness and wear of the variator system.

The use of a commuter electronic system is especially critical in this connection.

SUMMARY OF THE INVENTION

The problem on which this invention is based is to provide a method for reducing the thermal load of an automatic transmission of a motor vehicle in an emergency operating mode with which method the thermal and mechanical damages on the automatic transmission are prevented due to heat action during the emergency operating mode.

With the aid of the inventive method in which, in the emergency operating mode, an admissible maximum engine torque for the emergency operating mode ($M\_mot\_max\_not$) is preset by the digital engine electronics system, it is possible to prevent, by a simple limitation of the operating range, any thermal overstress and heat-determined wear of the components of the automatic transmission, and thermal aging of the transmission oil.

The limitation of the engine torque by a program module in the engine electronics, which also leads to a limitation of the vehicle speed, and represents a simple but effective step, both in regard to an electrohydraulically controlled stepped automatic transmission of the conventional type and to a CVT transmission.

The use of the inventive method is of special advantage in CVT transmissions, since with only a slight limitation of the operating conditions, the generation of heat in the variator is prevented together with the attendant consequences of wear.

The inventive protection function also serves very advantageously protection in a converter automatic transmission in case the possible transmission input torque, as consequence of the torque overshoot, can exceed the admissible transmission input torque specific to the transmission part.

In this case, the maximum admissible transmission input torque on the part of the digital engine electronics system can be permanently protected by a fuse or by a corresponding limitation of the maximum admissible engine torque in the emergency operating mode.

It can also be alternatively provided that the digital engine electronics system, by means of a so-called stall speed limitation, carries out a self-sufficient engine engagement by which a converter increase is simultaneously limited.

BRIEF DESCRIPTION OF THE DRAWING(S)

Figure 2:
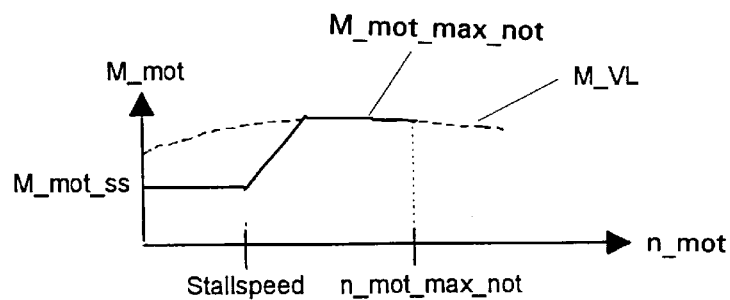
Figure 3:
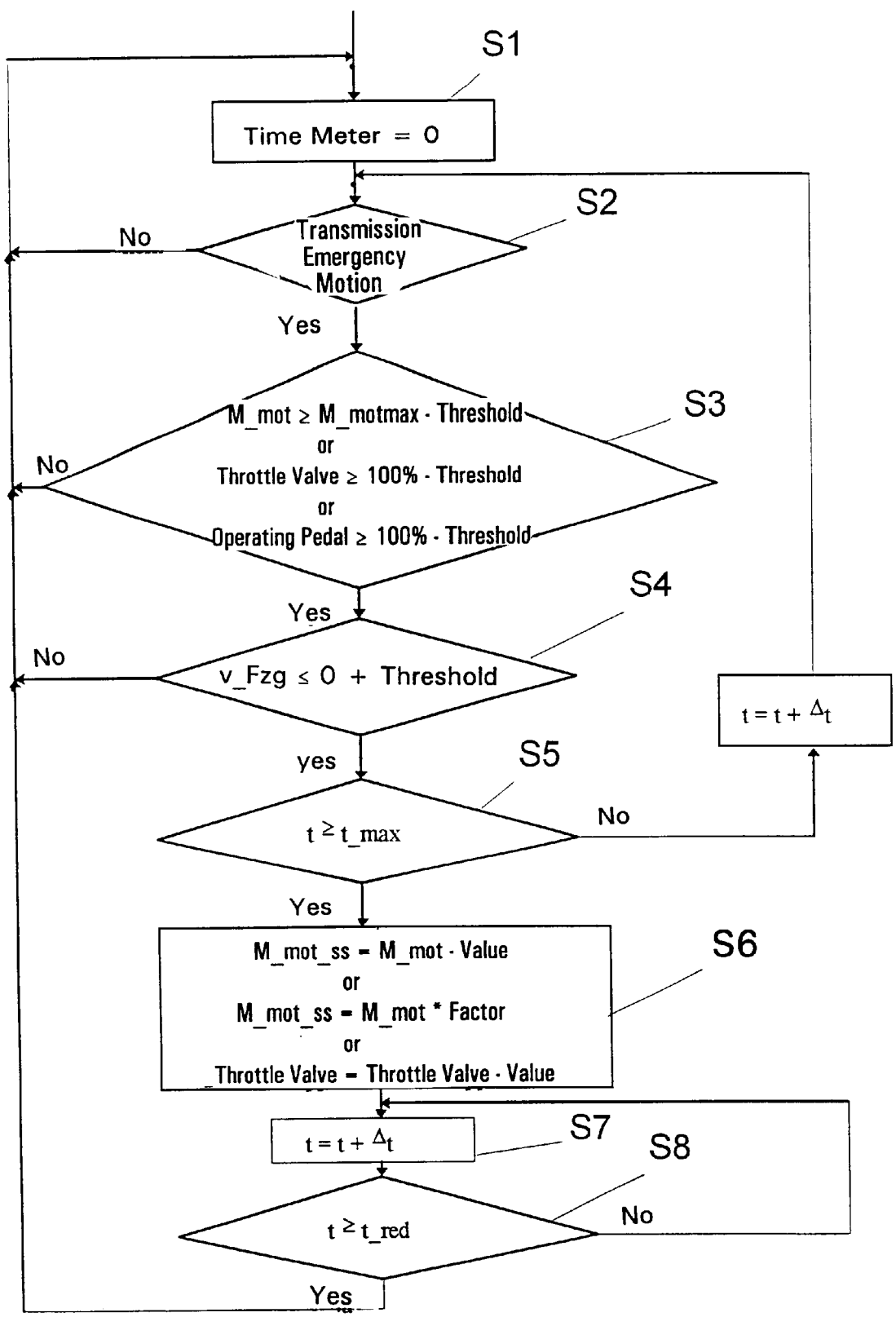

Other advantages and developments of the invention result from the sub-claims and from the embodiments fundamentally described with reference to the drawing which shows:

FIG. 1 a flow chart of a method for reducing the thermal load of an automatic transmission in an emergency operating mode by engine torque reduction;

FIG. 2 a schematized representation of the curve of the engine torque according to the engine rotational speed with an engine torque reduction in a stall speed range; and FIG. 3 a flow chart for the engine torque reduction in the stall speed range according to FIG. 2 with a timed limitation of the operating mode in the stall speed range.

DETAILED DESCRIPTION OF THE INVENTION

Referring to FIG. 1, it diagrammatically shows a method for reducing the thermal load of an automatic transmission in an emergency operating mode by limiting an engine torque $M\_mot$.

To apply the method, in a digital engine electronics system of an internal combustion engine (not shown in detail), which exchanges signals via a CAN (Controller Area Network) data bus with an electronic transmission control device, a program module M1 is provided which is independent of the transmission control.

In the program module M1 is, first, constantly tested in a first function F1 whether a CAN signal indicative of a normal operation of the electronic transmission control device enters into the digital engine electronics system. When this is the case, the digital engine electronics system issues in a subsequent function F2 as admissible engine torque $M\_mot\_zul$ a maximum torque provided for the vehicle in the normal operation $M\_mot\_max$.

Due to failure of the CAN signal which governs the normal operation, if it is detected that the transmission is in emergency operating mode, in a function F3, the digital engine electronics system limits the admissible engine torque $M\_mot\_zul$ to a maximum engine torque for the emergency operating mode $M\_mot\_max\_not$, which amounts to 0.6 time of the maximum engine torque $M\_mot\_max$, for example.

In the emergency operating mode, it is tested in one other differentiation function F4 whether an actual engine torque $M\_mot$ is lower than or equal to the maximum engine torque for the emergency operating mode $M\_mot\_max\_not$. If this is the case, the beginning of the program module M1 is branched back to.

However, when the actual engine torque $M\_mot$ is higher than the admissible maximum engine torque for the emergency operating mode $M\_mot\_max\_not$ as preset, a transition function F5 likewise implemented in the digital engine electronics system is started which ensures a reliable transition from the actual engine torque $M\_mot\_max\_not$.

The time-dependent transition function F5 reduces the actual engine torque $M\_mot$ ramp-like, i.e. slowly, until the admissible maximum engine torque for the emergency operating mode $M\_mot\_max\_not$ is reached. Thereby an abrupt engine torque change with accompanying losses in driving comfort and vehicle instabilities is prevented.

In the instant embodiment, the method for reducing the thermal load of the automatic transmission in the emergency operating mode is applied to a CVT automatic transmission which has a variator with a primary pulley set, a secondary pulley set and a linking band wound around them as a torque-transmitting element. In the emergency operating mode, a contact pressure regulation of the secondary pulley set is interrupted and a constant static pressure ratio is adjusted between the primary pulley set and the secondary pulley set.

By limiting the admissible engine torque $M\_mot\_zul$ in the emergency operating mode of the transmission, the operating range of the vehicle is purposefully limited, the operating modes of the CVT automatic transmission being reduced with higher overpressing on the variator without clearly limiting the operating readiness of the vehicle.

Referring to FIG. 2, it shows an engine torque reduction in a stall speed range with a self-sufficient engine engagement of the digital engine electronic system with reference to characteristic lines in an engine torque/engine rotational speed diagram.

The instant embodiment refers to torque converter automatic transmission. The reduction of the thermal transmission load is of special importance in torque converter automatic transmission as in the case of the hydraulic transmission emergency operation, since the lock-up clutch can no longer be closed in the emergency operating mode for lack of actuator engagement, whereby a thermally critical situation generates.

An operating range of very high heat entrance into the transmission is fundamentally the stall speed range. This can be consciously brought about by the driver, an extended stay in or near a stall speed point being thermally critical.

In order to improve the critical interpretation point regarding the thermal development in the transmission, what comes up in the first place is to define a constant maximum engine torque for the emergency operating mode of the transmission, as in the method shown in FIG. 1.

However, with a limitation of the engine torque adequate for the stall speed point over the whole operating range, an engagement is effected whereby the driveability or availability of the vehicle is definitely reduced.

With the solution shown in FIG. 2, the engine torque $M\_mot$ is reduced only in the critical stall speed range to a stall speed value $M\_mot\_ss$. Above the adequate rotational speed of the stall speed, the maximum engine torque M_mot_max is again admitted with full load VL until gripping in of a rotational speed limitation for the emergency operating mode n_mot_max_not, which constitutes a speed limitation.

Simultaneously with the engine torque limitation, a converter increase (not shown) is limited when a torque converter serves as input element.

In the manner shown in FIG. 2, a maximum possible availability of the vehicle is achieved in the emergency operating mode of the transmission.

Referring to FIG. 3, it shows a method for carrying out an engine torque limitation in the stall speed range explained with reference to FIG. 2 wherein, as mechanical protection of the automatic transmission, the engine torque in the stall speed range M_mot_ss is limited to an admissible static transmission input torque M_Getrieb_ein in a shifting position requiring positive engagement.

In order to obtain a further increase of the vehicle mobility, in the embodiment shown in FIG. 3 the operating mode is limited according to time in the stall speed.

As is to be understood from FIG. 3, a time meter is reset, first, in a step S1 and, in a subsequent differentiation function S2, is tested whether a transmission emergency motion is present. When this is the case, in one other step S3 is tested whether a high transmission input torque is present. As criterion for this serves a threshold value related to the maximum admissible engine torque M_mot_max or the throttle valve or the accelerator pedal.

In addition to detect a driver's misuse, it is possible in other embodiments to use a brake light or brake pressure information, the same as a rotational stall speed to be expected as specific to the torque converter.

When a higher transmission input torque is detected, in another differentiation function S4 is tested whether a vehicle standstill or a low defined vehicle speed is present. If this is also the case, in a step S5 is inquired whether a first applicable time t_max of 10 sec. has elapsed.

If this condition is met, in another step S6 the transmission input torque reduction to the stall speed value M_mot_ss, which corresponds here to 20% of a full load torque M_VL, is carried out with suitable means such as an injection extraction or taking back a throttle valve.

Only after lapse of another application time t_red of 2 min. started in a step S7 and monitored in a differentiation function S8, is the full engine torque M_mot_max_not again admitted in order to prevent the driver from causing a repeated operating mode in the stall speed range.

In the manner shown in FIG. 3, it is unmistakably possible to counteract the heating of the transmission oil and a thermal overstress of the transmission.

As long as the electronic transmission control is still active in the hydraulic emergency motion, this can also require the torque reduction as long-time engine engagement via a CAN signal in the engine control.

Finally, in other embodiments, it is possible to improve the cooling of the transmission, to start an engine ventilator which is operated at an applicable coolant temperature lowered, e.g. by 20 K C_Luefter_ein_not. Alternatively to this, the engine ventilator can obviously rotate permanently.

| References | |
|---|---|
| F1 | differentiation function |
| F2 | processing function |
| F3 | processing function |
| F4 | differentiation function |
| F5 | transition function |
| M1 | program module |
| M_mot | engine torque |
| M_mot_max_not | admissible maximum engine torque in the emergency operating mode |
| M_mot_ss | engine torque in the stall speed range |
| M_mot_zul | admissible engine torque |
| M_VL | full load torque |
| n_mot | engine rotational speed |
| n_mot_max_not | rotational speed limitation |
| S1 | processing function |
| S2 | differentiation function |
| S3 | differentiation function |
| S4 | differentiation function |
| S5 | differentiation function |
| S6 | processing function |
| S7 | processing function |
| S8 | differentiation function |
| t | time |
| t_max | applicable time |
| t_red | applicable time |
| v_FZG | vehicle speed |

What is claimed:

1. A method for reducing the thermal load of an automatic transmission for a motor vehicle in an emergency operating mode wherein the automatic transmission is controlled by an electronic transmission control device which continuously exchanges signals with a digital engine electronics system of an internal combustion engine, comprising the steps of:
monitoring a signal of the electronic transmission control device and the engine electronics system that indicates when the engine and transmission are operating normally, and
when the signal indicates that one of the engine and transmission are not operating normally, initiating operation in an emergency mode,
initiating an emergency operation mode of the digital engine electronics system, and
in the emergency operation mode and from an emergency program module of the digital engine electronics system and independently from the electronic transmission control device and from a transmission-independent program module, generating a preset signal setting an admissible maximum engine torque for the emergency operating mode (M_mot_max_not).

2. The method according to claim 1, wherein the admissible maximum engine torque for the emergency operating mode (M_mot_max_not) is preset when the digital engine electronics system detects the emergency operating mode of the automatic transmission based on the failure of a signal of the electronic transmission control device indicative of a normal operation.

3. The method according to claim 1, wherein a constant value is selected as admissible maximum engine torque for the emergency operating mode (M_mot_max_not).

4. The method according to claim 1, wherein the 0.6 fold of a maximum possible engine torque (M_mot_max) of the engine in normal operation is selected as admissible maximum engine torque for the emergency operating mode (M_mot_max_not).

5. The method according to claim 1, wherein the admissible engine torque (M_mot) is preset according to an engine rotational speed (nmot) so that in a defined stall speed range the admissible engine torque is further reduced to a stall speed value for admissible engine torque, (M_motss) the stall speed value (M_mot_ss) for admissible engine torque is lower than an admissible maximum engine torque for the emergency operating mode (n_mot_max_not) and the engine rotational speed is greater than the stall speed range the admissible engine torque is the admissible maximum engine torque.

6. The method according to claim 5, wherein the stall speed range is detected by monitoring the actual engine torque (M_mot) or a variable equivalent to it and an actual vehicle speed (v_) or a variable equivalent to it (throttle valve, accelerator pedal).

7. The method according to claim 5, wherein an operating mode consciously brought about by a driver is detected in the stall speed range by a brake light signal, or a brake pressure signal, or a stall speed specific to the type of transmission.

8. The method according to claim 5, wherein an operating mode is limited according to time in the stall speed range.

9. The method according to claim 8, wherein the engine torque in the stall speed range (M_mot_ss), after lapse of a first applicable time (t_max), is reduced to an applicable value (M_mot×Faktor) and the maximum engine torque (M_mot_max) is again admitted after lapse of a further applicable time (t_red).

10. The method according to claim 9, wherein for the first applicable time (t_max) a time period of at least near 10 sec and for the other applicable time (t_red) a time period of at least near 2 min. is selected.

11. The method according to claim 5, wherein the engine torque in the stall speed range (M_mot_ss) is reduced as mechanical protection of the automatic transmission to an admissible static transmission input torque (M_Getriebe_ein) in a shifting position requiring positive engagement.

12. The method according to claim 5, wherein the engine torque in the stall speed range (M_mot_ss) is limited to an applicable percentage of a full load torque (M_VL).

13. The method according to claim 1, wherein a transition function for converting an actual engine torque (M_mot) to the admissible maximum engine torque for the emergency operating mode (M_mot_max_not) or an actual engine rotational speed (n_mot_) to the admissible maximum engine rotational speed for the emergency operating mode (n_mot_max_not) is started when the actual engine torque (M_mot) or the actual engine rotational speed (n_mot_) is higher than the admissible maximum engine torque for the emergency operating mode (M_mot_max_not) or the admissible maximum engine rotational speed for the emergency operating mode (n_mot_max_not).

14. The method according to claim 13, wherein the actual engine torque (M_mot_) is ramp-like converted to the admissible maximum engine torque for the emergency operating mode (M_mot_max_not) or the actual engine rotational speed (n_mot_) to the admissible maximum engine rotational speed for the emergency operating mode (n_mot_max_not).

15. The method according to claim 1, wherein the electronic transmission control device controls a variator of the automatic transmission with a primary pulley set, with a secondary pulley set and with a torque-transmitting element wound around them wherein in the emergency operating mode a contact pressure regulation of the secondary pulley set is interrupted and a constant static pressure ratio is adjusted between the primary pulley set and the secondary pulley set.

16. The method according to claim 1, wherein the electronic transmission control device controls a torque converter automatic transmission.

17. The method according to claim 1, wherein an engine ventilator with an applicable lowered coolant temperature (C_Luefter_ein_mot) is operated when the emergency operating mode of the automatic transmission is detected.

18. The method according to claim 1, wherein an engine ventilator permanently rotates.

* * * * *